United States Patent Office 2,914,392
Patented Nov. 24, 1959

2,914,392
METHOD OF DESTROYING VEGETATION

John J. D'Amico, Nitro, W. Va., assignor to Monsanto Chemical Company, St. Louis, Mo., a corporation of Delaware No Drawing. Application November 9, 1956
Serial No. 621,211

4 Claims. (Cl. 71—2.5)

The present invention relates to methods of destroying or controlling vegetation and to herbicidal compositions adaptable for such use. More particularly the invention relates to destroying or controlling vegetation by employing as a herbicide when applied thereto, said herbicide comprising one of a group of sulfenamide compounds and particularly a chlorobenzothiazole sulfenamide.

The herbicides comprising the present invention most conveniently may be represented by the general formula

wherein R represents a mercaptobenzothiazole nucleus containing halogen in the carbocyclic ring, $R_1$ represents an hydrogen or alkyl group and $R_2$ represents an alkyl or aryl group, the latter group preferably being a cyclohexyl group. The alkyl groups include the methyl, ethyl, propyl and isopropyl groups.

The products preferred for use as herbicides as hereinafter described may be obtained by the general method of producing sulfenamides, of which the following will serve as examples.

EXAMPLE 1—PRODUCT A

*5-chloro-N-cyclohexyl-2-benzothiazolesulfenamide*

In an acid resistant reactor equipped with suitable agitating means and temperature recording means was charged 50.4 parts (0.25 mole) of 5-chloro-2-mercaptobenzothiazole, 170 parts of water and 40 parts (0.25 mole) of 25% sodium hydroxide solution. Thereupon 99 parts (1.0 mole) of cyclohexylamine were added followed by the slow addition from an auxiliary container connected to the reactor by flow controlling means of 49.7 parts of 25% sulfuric acid. The temperature during the addition of the acid was maintained at between 30–35° C. There was then slowly added, while holding the temperature of the entire mixture between 35–40° C., 30 parts of sodium hypochlorite in solution (200 ml. of a solution containing 15 grams/100 ml). Agitation of the mixture was continued for about one-half hour after all ingredients were present when any excess oxidizing agent was destroyed by the addition of about 1 part of sodium sulfite. The solid product formed was then separated by filtration means, was washed with water until free from soluble salts and acid and was then dried. A white solid, melting at 93–94° C. was obtained which was insoluble in water but was soluble in ether, acetone, chloroform, benzene, heptane, ethyl alcohol and ethyl acetate. The empirical formula of the expected product named at the start of this example is $C_{13}H_{15}ClN_2S_2$.

Identification of the product was confirmed by analysis which gave as results:

|            | Percent Theory | Percent Found |
|------------|----------------|---------------|
| Nitrogen   | 9.37           | 9.40          |
| Sulfur     | 21.46          | 21.57         |
| Chlorine   | 11.86          | 11.89         |

EXAMPLE 2—PRODUCT B

As an example of another product effective for use as an herbicide, 5-chloro-N,N-diisopropyl-2-benzothiazolesulfenamide was obtained by stirring together for approximately a two hour period, a mixture of 46 parts (0.114 mole) of 2,2′-dithiobis-(5-chlorobenzothiazole), 80 parts (0.5 mole) of 25% aqueous sodium hydroxide solution, 101.2 parts (1.0 mole) of diisopropylamine and 500 parts of water. The solid product was separated by filtration and was washed with water until the washings were neutral to litmus and the product was air dried at room temperature. The product was a tan colored solid melting at 61° C. and possessed the same solubility characteristics as the product of Example 1. Identification of the product as the one named above, of empirical formula $C_{13}H_{17}ClN_2S_2$ was confirmed by analysis as shown by the following results:

|            | Percent Theory | Percent Found |
|------------|----------------|---------------|
| Nitrogen   | 9.31           | 9.41          |
| Sulfur     | 21.32          | 21.42         |
| Chlorine   | 11.78          | 11.96         |

EXAMPLE 3—PRODUCT C

*5-chloro-N-isopropyl-2-benzothiazolesulfenamide*

The above-named product was obtained by agitating a mixture of 50.4 parts (0.25 mole) of 5-chloro-2-mercaptobenzothiazole, 80 parts (0.5 mole) of 25% aqueous sodium hydroxide, 147.8 parts (2.5 moles) of monoisopropylamine and 1000 parts of water. Thereupon, while agitating, and over a period of about two hours there were added 64 parts of iodine dissolved in 850 parts of water containing 69 parts of potassium iodide. After the oxidizing agent had all been added agitation was continued for about another hour, the reaction mass was then cooled in a suitable manner to about 10° C. and the product removed by filtration. The product was washed with water until the washings were neutral to litmus and were then air dried at room temperature. The product was a tan colored solid melting at 65–66° C. and of the same solvent characteristics as the products of the first two examples hereof. Identification of the product as named above (empirical formula $C_{10}H_{11}ClN_2S_2$) was confirmed by the analytical results obtained:

|            | Percent Theory | Percent Found |
|------------|----------------|---------------|
| Nitrogen   | 10.83          | 10.85         |
| Sulfur     | 24.78          | 24.45         |
| Chlorine   | 13.70          | 13.74         |

In the case of the present invention, greatest effectiveness is apparent where the lower members of the alkyl series, that is alkyl groups containing not more than three carbon atoms are substituted in the sulfenamide as shown. Moreover, the concentration of the herbicide employed also is important. In cases where the herbicides of the present invention are applied to foliage, concentrations of the herbicide in the emulsion ranging from 0.3 to 1.0% by weight are required. Where the herbicide is employed in pre-emergence application for control of grass or weeds, the herbicide is employed in quantities of 25 to 50 pounds active material to the acre.

The table below illustrates the characteristic herbicidal activity of the sulfenamides within the present invention. The sulfenamide was emulsified in water and the emulsion applied as a spray. The emulsion is prepared in the well known manner. For example, the sulfenamide in required quantity as shown above is dissolved in one of the organic solvents mentioned under the examples set forth and then dispersed in water, employing as dispersing or wetting agents soft or hard sodium or potassium soaps, alkylated aromatic sulfonates, such as sodium dodecyl benzene sulfonate and the like. Alternatively, the herbicides described herein may be formulated and applied as dry compositions by mixing the sulfenamide with a finely divided solid carrier, as for example talc, clay, pyrophyllite, silica and fuller's earth. Also, the dry solid free flowing mixture of the sulfenamide and solid carrier may be dispersed in water and applied as a spray.

Using the spray as described above, in the foliage tests the spray containing the concentration of the active ingredient shown in the table was applied to the foliage of grass and foliage of bean plants and finally to the foliage of a mixture of broadleaved plants and the effect recorded. For convenience in recording the phytotoxicity, the following rating key for phytotoxicity was used:

No phytotoxicity _____ 0
Slight phytotoxicity _____ 1
Moderate phytotoxicity _____ 2
Severe phytotoxicity _____ 3
Dead _____ 4
Defoliation _____ B

|  | Product A | | Product B | | Product C | |
|---|---|---|---|---|---|---|
|  | 1.0% | 0.3% | 1.0% | 0.3% | 1.0% | 0.3% |
| Corn | 3 | 1 | 4 | +3 | ----- | ----- |
| Bean | 0 | 0 | 3 | 3 | *3B | *1B |
| Grass | ----- | ----- | ----- | ----- | 1 | 1 |
| Broadleaf | ----- | ----- | ----- | ----- | 3 | 2 |

*1% product C, 80% defoliated; 0.3% product C, 10% defoliated.

It is intended to cover all changes and modifications of the examples of the invention herein chosen for purposes of disclosure which do not constitute departures from the spirit and scope of the invention.

What is claimed is:

1. A method of destroying vegetation which comprises contacting the plant with a toxic concentration of a sulfenamide of the structure

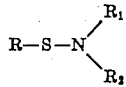

wherein R represents the 5-chloro-2-benzothiozolyl radical, $R_1$ represents a member of a group consisting of hydrogen, methyl, ethyl, propyl and isopropyl, and $R_2$ represents a member of a group consisting of methyl, ethyl, propyl and isopropyl and cyclohexyl groups.

2. A method of destroying vegetation which comprises contacting the plant with a toxic concentration of 5-chloro-N-cyclohexyl-2-benzothiazolesulfenamide.

3. A method of destroying vegetation which comprises contacting the plant with a toxic concentration of 5-chloro-N,N-diisopropyl-2-benzothiazolesulfenamide.

4. A method of destroying vegetation which comprises contacting the plant with a toxic concentration of 5-chloro-N-isopropyl-2-benzothiazolesulfenamide.

References Cited in the file of this patent

UNITED STATES PATENTS

| 2,393,500 | Carr | Jan. 22, 1946 |
| 2,419,294 | Skaptason | Apr. 22, 1947 |
| 2,474,237 | Eby | June 28, 1949 |
| 2,704,761 | D'Amico | Mar. 22, 1955 |